(12) United States Patent
Gal

(10) Patent No.: US 11,263,724 B2
(45) Date of Patent: Mar. 1, 2022

(54) DEVICE FOR INTERPOLATING COLORS AND METHOD THEREOF

(71) Applicant: HANWHA TECHWIN CO., LTD., Seongnam-si (KR)

(72) Inventor: Jun Ho Gal, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 106 days.

(21) Appl. No.: 16/751,922

(22) Filed: Jan. 24, 2020

(65) Prior Publication Data

US 2021/0104016 A1 Apr. 8, 2021

(30) Foreign Application Priority Data

Oct. 2, 2019 (KR) .................. 10-2019-0122090

(51) Int. Cl.
*G06T 3/40* (2006.01)
*G06T 5/20* (2006.01)
*G06T 7/90* (2017.01)

(52) U.S. Cl.
CPC .............. *G06T 3/4015* (2013.01); *G06T 5/20* (2013.01); *G06T 7/90* (2017.01); *G06T 2207/10024* (2013.01)

(58) Field of Classification Search
None
See application file for complete search history.

(56) References Cited

U.S. PATENT DOCUMENTS

| 6,563,537 | B1 * | 5/2003 | Kawamura | ........ H04N 9/04557 348/252 |
| 7,305,123 | B2 * | 12/2007 | Messina | ................. G06T 3/4015 382/162 |

(Continued)

FOREIGN PATENT DOCUMENTS

| JP | 2010-104019 A | 5/2010 |
| JP | 4840468 B2 | 12/2011 |

(Continued)

OTHER PUBLICATIONS

Aleksic et al., Electrical and Computer Engineering, 2004. Canadian Conference on Niagara Falls, Ont., Canada May 2-5, 2004, Piscataway, NJ, USA, IEEE, US, May 2, 2004, pp. 793-796 vol. 2, XP010733565, ISBN: 0-7803-8253-6. (Year: 2004).*

(Continued)

*Primary Examiner* — Andrae S Allison
(74) *Attorney, Agent, or Firm* — Sughrue Mion, PLLC

(57) ABSTRACT

A device for interpolating a color includes at least one processor to implement: a directions interpolation candidate values calculator configured to calculate third horizontal/vertical directions interpolation candidate values with respect to a pixel in a red (R) channel or a blue (B) channel on a Bayer color filter array pattern, based on a local gradient similarity between the R channel and a green (G) channel or a local gradient similarity between the B channel and the G channel; a directions interpolation weights calculator configured to calculate third horizontal/vertical directions interpolation weights based on the first horizontal/vertical directions interpolation candidate values by using a local complexity; and a G value interpolation execution unit configured to interpolate a G value of the pixel in the R channel or the B channel based on the calculated third horizontal/vertical directions interpolation candidate values and the third calculated horizontal/vertical directions interpolation weights.

18 Claims, 11 Drawing Sheets

(56) References Cited

U.S. PATENT DOCUMENTS

| | | | |
|---|---|---|---|
| 7,995,840 B2 | 8/2011 | Lukac | |
| 8,077,234 B2 * | 12/2011 | Takemura | H04N 9/04515 348/280 |
| 8,237,830 B2 * | 8/2012 | Jannard | G06T 5/002 348/273 |
| 8,571,312 B2 * | 10/2013 | Chang | H04N 9/04515 382/167 |
| 10,535,126 B2 * | 1/2020 | Park | G06T 5/40 |
| 10,572,974 B2 * | 2/2020 | Swami | G06T 5/50 |
| 2004/0196395 A1 * | 10/2004 | Lee | H04N 9/04557 348/272 |
| 2006/0170798 A1 * | 8/2006 | Lee | H04N 9/04515 348/272 |
| 2006/0268134 A1 * | 11/2006 | Chen | H04N 5/3651 348/241 |
| 2007/0091188 A1 | 4/2007 | Chen et al. | |
| 2009/0066821 A1 * | 3/2009 | Achong | H04N 9/04557 348/273 |
| 2010/0097491 A1 * | 4/2010 | Farina | H04N 5/232 348/223.1 |
| 2010/0254630 A1 * | 10/2010 | Ali | G06T 3/4053 382/300 |
| 2013/0321676 A1 * | 12/2013 | Silverstein | H04N 9/04515 348/242 |

FOREIGN PATENT DOCUMENTS

| | | | |
|---|---|---|---|
| KR | 2008-0078262 | * | 2/2007 |
| KR | 10-2008-0026998 A | | 3/2008 |
| KR | 10-0866187 | * | 10/2008 |
| KR | 10-2012-0040764 A | | 4/2012 |
| KR | 10-1637488 B1 | | 7/2016 |
| KR | 10-1700928 B1 | | 2/2017 |

OTHER PUBLICATIONS

"High-Quality Linear Interpolation for Demosaicing of Bayer-Patterned Color Images", Malvar et al., Acoustics, Speech, and Signal Processing, 2004. Proceedings. (ICASSP '04). IEEE International Conference on Montreal, Quebec, Canada, Piscataway, NJ, USA, IEEE, May 17, 2004, pp. 458-488 (Year: 2004).*

A Global Enhancement Pipeline for Low-cost Imaging Devices, Battiato et al., IEEE Transactions on Consumer Electronics, IEEE Inc., New York, US, vol. 49, No. 3, Aug. 2003, pp. 670-675, XP001172113, ISSN: 0098-3063. (Year: 2003).*

"Bayer Image Enlargement Using Correlated Color Components", Battiato et al., 2002 Digest of Technical Papers, International Conference on Consumer Electronics (IEEE Cat No. 02CH37300) IEEE Piscataway, NJ, USA, 2002, pp. 230-231, XP002357651, ISBN: 0-7803-7300-6. (Year: 2002).*

* cited by examiner

DEVICE FOR INTERPOLATING COLORS AND METHOD THEREOF

CROSS-REFERENCE TO THE RELATED APPLICATION

This application claims priority from Korean Patent Application No. 10-2019-0122090 filed on Oct. 2, 2019, in the Korean Intellectual Property Office, and all the benefits accruing therefrom under 35 U.S.C. 119, the contents of which in their entirety are incorporated herein by reference.

BACKGROUND

1. Field

The disclosure relates to a device for interpolating a color, and more specifically, to a device for interpolating a color and a method for interpolating a color, in which color interpolation is performed by adaptively using two or more methods of calculating interpolation candidates for each direction using a local gradient similarity, and by adaptively using two or more methods of calculating interpolation weights for each direction using local complexity.

2. Description of the Related Art

Generally, a digital image processing device uses an image sensor. A color filter array (CFA) may be used in front of the image sensor to obtain color information. Since only information on one color is included in one pixel, a method for interpolating colors using correlations between R, G, and B channels may be used to obtain a full color image. A Bayer CFA is commonly used to obtain color information. In the Bayer CFA, since a G channel has more information than an R channel or a B channel, a G channel may be first restored in an R channel and a B channel. The remaining R and B channels are restored with reference to the restored G channel. Therefore, restoring the G channel from the R and B channels is very important in a Bayer image interpolation system.

An interpolation process of the G value in the R channel and the B channel includes performing pre-interpolation for horizontal and vertical directions of the G value at a Bayer R or B pixel position, calculating horizontal and vertical directions interpolation candidate values of the G channel to be interpolated, and calculating horizontal and vertical directions interpolation weights of the G channel to be interpolated.

When calculating the directions interpolation candidate values or calculating the directions interpolation weights, two or more methods may be used. However, there are advantages and disadvantages for each method, which raises the question of which method is to be used.

SUMMARY

One or more example embodiments provide Aspects of the provide a device for interpolating a color that performs color interpolation by adaptively using two or more methods of calculating interpolation candidates for each direction by using a local gradient similarity, and by adaptively using two or more methods of calculating interpolation weights for each direction by using a local complexity.

According to an aspect of an example embodiment, there is provided a device for interpolating a color, including at least one processor to implement: a directions interpolation candidate values calculator configured to calculate third horizontal/vertical directions interpolation candidate values with respect to a pixel in a red (R) channel or a blue (B) channel on a Bayer color filter array pattern, based on a local gradient similarity between the R channel and a green (G) channel or a local gradient similarity between the B channel and the G channel; a directions interpolation weights calculator configured to calculate third horizontal/vertical directions interpolation weights based on the first horizontal/vertical directions interpolation candidate values by using a local complexity; and a G value interpolation execution unit configured to interpolate a G value of the pixel in the R channel or the B channel based on the calculated third horizontal/vertical directions interpolation candidate values and the third calculated horizontal/vertical directions interpolation weights.

The directions interpolation candidate values calculator may include: a first directions interpolation candidate values calculator configured to calculate first horizontal/vertical directions interpolation candidate values through pre-interpolation with respect to the pixel on the Bayer color filter array pattern; a second directions interpolation candidate values calculator configured to calculate second horizontal/vertical directions interpolation candidate values by applying a high pass filter to an R channel candidate value and a B channel candidate value and applying a low pass filter to a G channel candidate value, among the first horizontal/vertical directions interpolation candidate values; a local gradient similarity calculator configured to calculate the local gradient similarity between the R channel and the G channel or the local gradient similarity between the B channel and the G channel; and a third directions interpolation candidate values calculator configured to calculate the third horizontal/vertical directions interpolation candidate values, based on the first horizontal/vertical directions interpolation candidate values and the second horizontal/vertical directions interpolation candidate values by applying weights, which are determined based on the calculated local gradient similarity.

A sum of the weights applied to the first horizontal/vertical directions interpolation candidate values and the second horizontal/vertical directions interpolation candidate values may be 1.

The first directions interpolation candidate values calculator may be configured to calculate the first horizontal/vertical directions interpolation candidate values by using a pre-directional interpolation method, and the second directions interpolation candidate values calculator is configured to calculate the second horizontal/vertical directions interpolation candidate values by using a directional successive approximation method.

The directions interpolation weights calculator may include: a first directions interpolation weights calculator configured to calculate first horizontal/vertical directions interpolation weights based on a sum of absolute values of differences for each of horizontal/vertical directions depending on the first horizontal/vertical directions interpolation candidate values; a second directions interpolation weights calculator configured to calculate second horizontal/vertical directions interpolation weights based on a local directional tendency depending on the first horizontal/vertical directions interpolation candidate values; a local complexity calculator configured to calculate the local complexity based on the sum of the absolute values of the differences for each of the horizontal/vertical directions depending on the first horizontal/vertical directions interpolation candidate values; and a third directions interpolation weights calculator configured to calculate the third horizontal/vertical directions interpolation weights by applying weights, which are determined based on the calculated local complexity, to the sum of the absolute values of the differences for each of the horizontal/vertical directions depending on the first horizontal/vertical directions interpolation candidate values.

The local complexity calculator may be configured to calculate the local complexity by using a Fourier transform or an absolute gradient summation.

The third horizontal/vertical directions interpolation weights calculator may be configured to apply a predetermined correction gain to be applied to the weights, which are determined based on the calculated local complexity, and the sum of the absolute values of the differences for each of the horizontal/vertical directions depending on the first horizontal/vertical directions interpolation candidate values.

The predetermined correction gain may be determined based on a user's input or a usage environment.

The first directions interpolation weights calculator may be configured to calculate the first horizontal/vertical directions interpolation weights by using a sum of directional absolute difference method, and the second directions interpolation weights calculator is configured to calculate the second horizontal/vertical directions interpolation weights by using a directional adaptive-homogeneity method.

The device may further include an R/B values interpolation execution unit configured to interpolate at least one of an R value or a B value based on the interpolated G value.

According to an aspect of an example embodiment, there is provided a method for interpolating a color performed by a device for interpolating a color, wherein the device includes one or more processors, the method including: calculating third horizontal/vertical directions interpolation candidate values with respect to a pixel in a red (R) channel or a blue (B) channel on a Bayer color filter array pattern, based on a local gradient similarity between the R channel and the G channel or a local gradient similarity between the B channel and the G channel; calculating third horizontal/vertical directions interpolation weights based on the first horizontal/vertical directions interpolation candidate values by using a local complexity; and interpolating a G value of the pixel in the R channel or the B channel based on the calculated third horizontal/vertical directions interpolation candidate values and the calculated third horizontal/vertical directions interpolation weights.

The calculating the third horizontal/vertical directions interpolation candidate values may include: calculating first horizontal/vertical directions interpolation candidate values through pre-interpolation with respect to the pixel on the Bayer color filter array pattern; calculating second horizontal/vertical directions interpolation candidate values by applying a high pass filter to an R channel candidate value and a B channel candidate value and applying a low pass filter to a G channel candidate value, among the first horizontal/vertical directions interpolation candidate values; calculating the local gradient similarity between the R channel and the G channel or the local gradient similarity between the B channel and the G channel; and calculating the third horizontal/vertical directions interpolation candidate values, based on the first horizontal/vertical directions interpolation candidate values and the second horizontal/vertical directions interpolation candidate values by applying weights, which are determined based on the calculated local gradient similarity.

A sum of the weights applied to the first horizontal/vertical directions interpolation candidate values and the second horizontal/vertical directions interpolation candidate values may be 1.

The first horizontal/vertical directions interpolation candidate values may be calculated by using a pre-directional interpolation method, and the second horizontal/vertical directions interpolation candidate values are calculated by using a directional successive approximation method.

The calculating the third horizontal/vertical directions interpolation weights may include: calculating first horizontal/vertical directions interpolation weights based on a sum of absolute values of differences for each of horizontal/vertical directions depending on the first horizontal/vertical directions interpolation candidate values; calculating second horizontal/vertical directions interpolation weights based on a local directional tendency depending on the first horizontal/vertical directions interpolation candidate values; calculating the local complexity based on the sum of the absolute values of the differences for each of the horizontal/vertical directions depending on the first horizontal/vertical directions interpolation candidate values; and calculating the third horizontal/vertical directions interpolation weights by applying weights, which are determined based on the calculated local complexity, to the sum of the absolute values of the differences for each of the horizontal/vertical directions depending on the first horizontal/vertical directions interpolation candidate values.

The local complexity may be calculated by using a Fourier transform or an absolute gradient summation.

The calculating the third horizontal/vertical directions interpolation weights may include applying a predetermined correction gain to the weights, which are determined based on the calculated local complexity, and the sum of the absolute values of the differences for each of the horizontal/vertical directions depending on the first horizontal/vertical directions interpolation candidate values.

The predetermined correction gain may be determined based on a user's input or a usage environment.

The first horizontal/vertical directions interpolation weights may be calculated by using a sum of directional absolute difference method, and wherein the second horizontal/vertical directions interpolation weights are calculated by using a directional adaptive-homogeneity method.

The method may further include interpolating at least one of an R value or a B value based on the interpolated G value.

BRIEF DESCRIPTION OF THE DRAWINGS

The above and other aspects and features of the disclosure will become more apparent by describing in detail embodiments thereof with reference to the attached drawings, in which.

DETAILED DESCRIPTION

Figure 1:
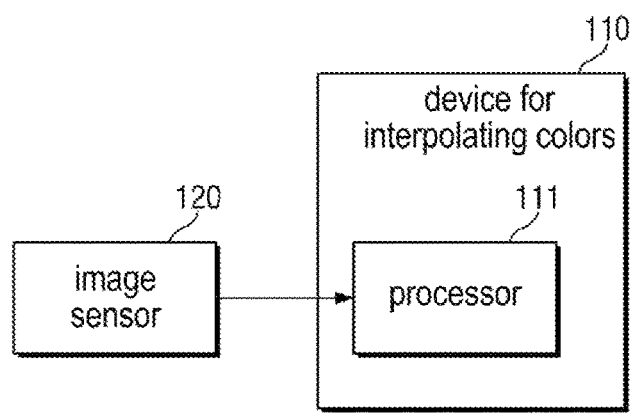
FIG. 1 is a block diagram of a device for interpolating a color according to an example embodiment of the disclosure.

Benefits and features of the disclosure, and methods for accomplishing the same will become apparent with reference to embodiments described below in detail in conjunction with the accompanying drawings. However, the disclosure is not limited to the embodiments disclosed below, but may be implemented in various forms. The example embodiments are merely provided to make the disclosure of the disclosure complete and to fully inform the scope of the disclosure to those ordinarily skilled in the art. The disclosure is defined only by the scope of claims. Like reference numerals refer to like elements throughout the specification.

Unless otherwise defined, all terms (including technical and scientific terms) used herein may be used in a sense that may be commonly understood by those of ordinary skill in the art. In addition, the terms defined in the commonly used dictionaries are not ideally or excessively interpreted unless they are specifically defined clearly.

The terms used herein are for the purpose of describing embodiments and are not intended to be limiting of the disclosure. Herein, the singular also includes the plural unless specifically stated otherwise in the phrase. The term "comprises" and/or "comprising" as used herein does not exclude the presence or addition of one or more other components in addition to the mentioned components. Also, the term "unit" in the exemplary embodiments indicates a software component or hardware component such as a field-programmable gate array (FPGA) or an application-specific integrated circuit (ASIC), and performs a specific function. However, the term "unit" is not limited to software or hardware. The "unit" may be formed to be in an addressable storage medium, or may be formed to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units".

FIG. 1 is a block diagram of a device for interpolating a color(s) according to an example embodiment of the disclosure.

A device for interpolating a color 110 according to an example embodiment of the disclosure may be configured to include one or more processors 111, and may further include one or more memories (not shown) or a communication interface (not shown). The device for interpolating a color 110 according to an example embodiment of the disclosure may be used for surveillance cameras, such as visual cameras, thermal cameras, or special purpose cameras, cameras for handheld terminals, camcorders, video systems for mobile devices, and the like. In addition, the device for interpolating a color 110 may be used in a variety of devices for displaying and expressing images and pictures.

The processor 111 may execute a program for interpolating a color, and the program for interpolating a color may be stored in a memory. The processor 111 interpolates a color of an image received from the image sensor 120.

Figure 2:
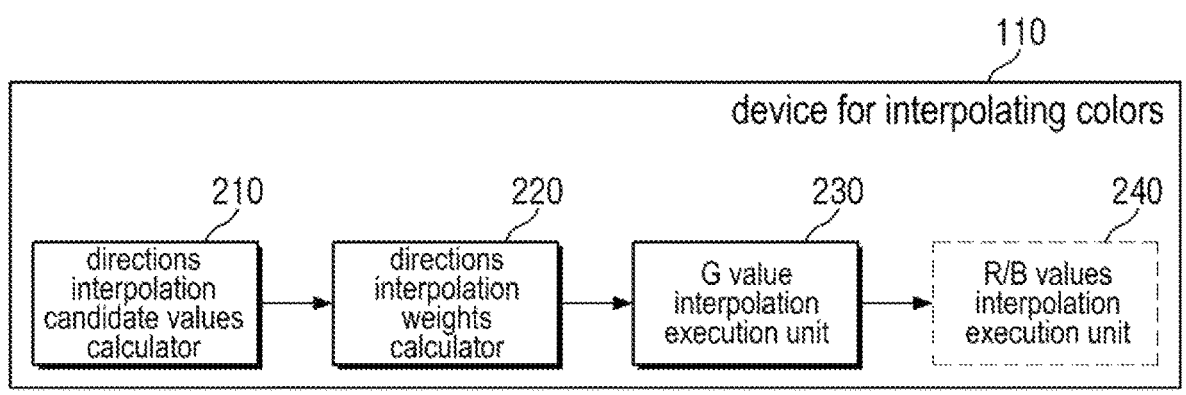
FIGS. 2, 3, and 6 are block diagrams of a device for interpolating a color according to an example embodiment of the disclosure.
Figure 3:
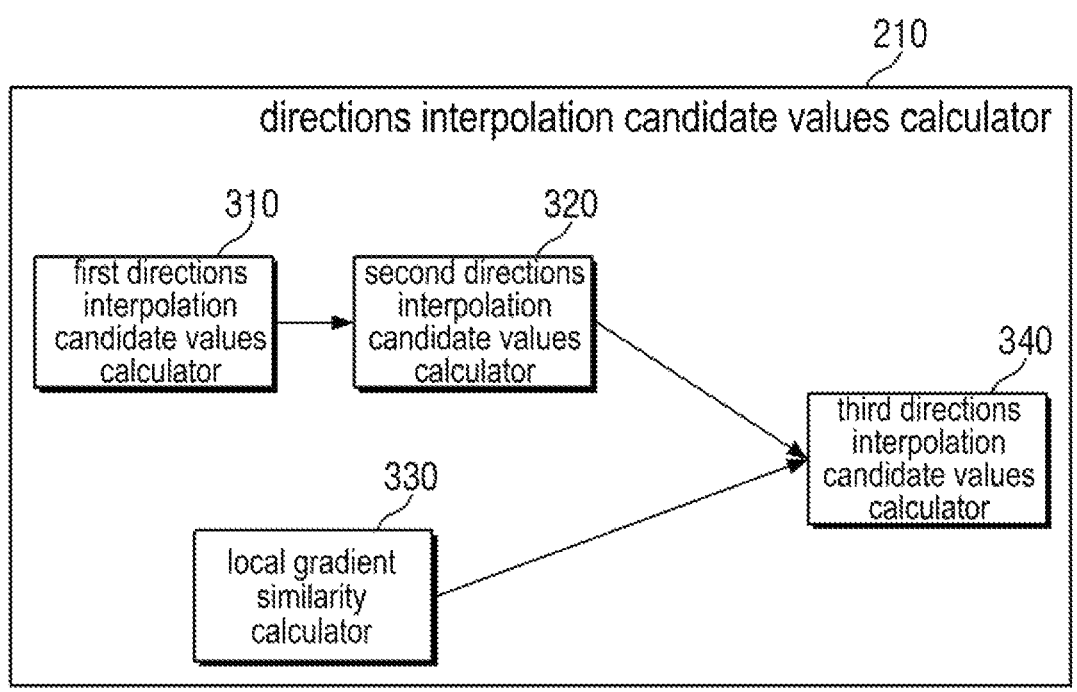
Figure 4:
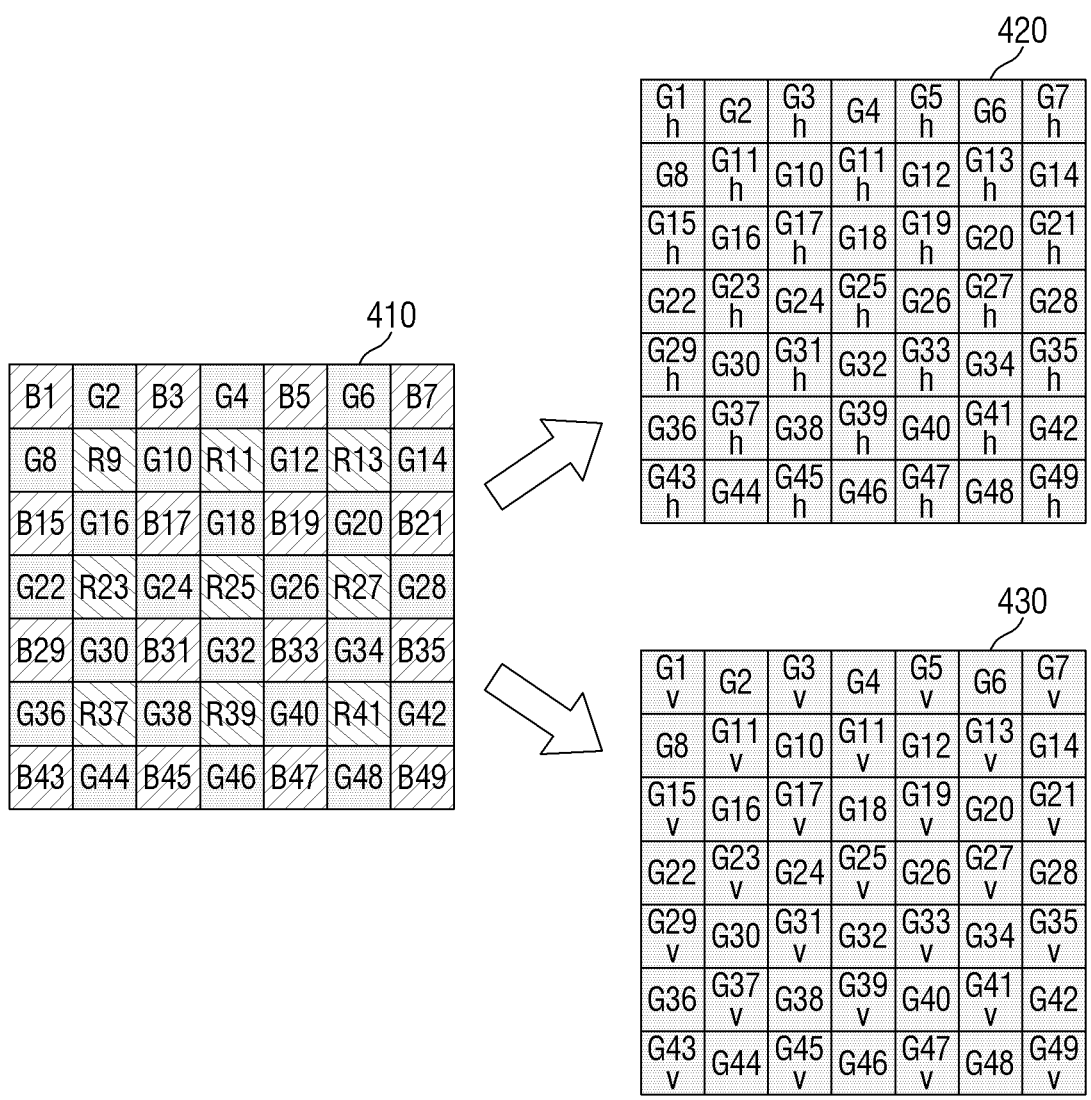
FIGS. 4, 5, and 7 are views for explaining a color interpolation process of a device for interpolating a color according to an example embodiment of the disclosure.
Figure 5:
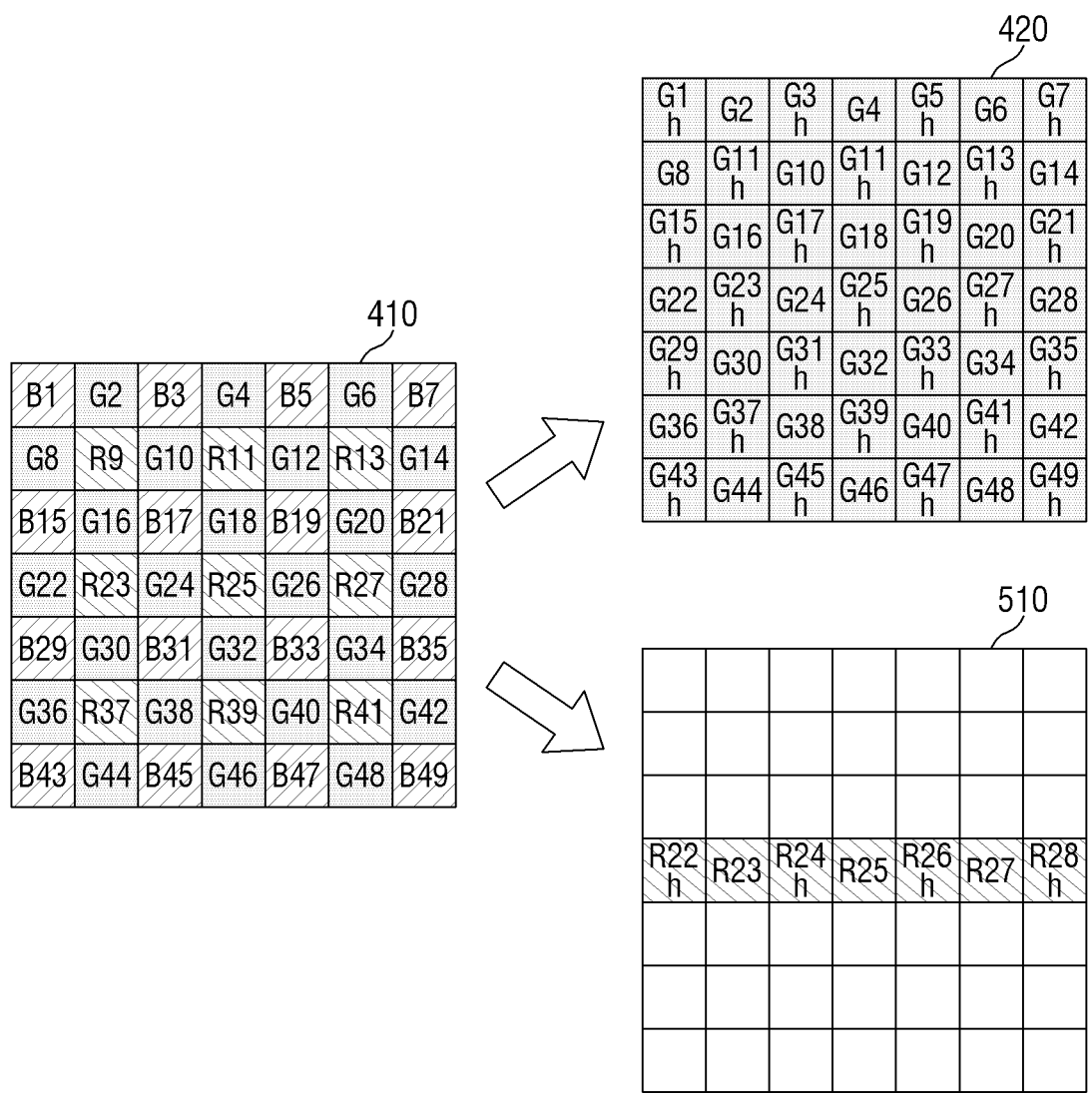
Figure 6:
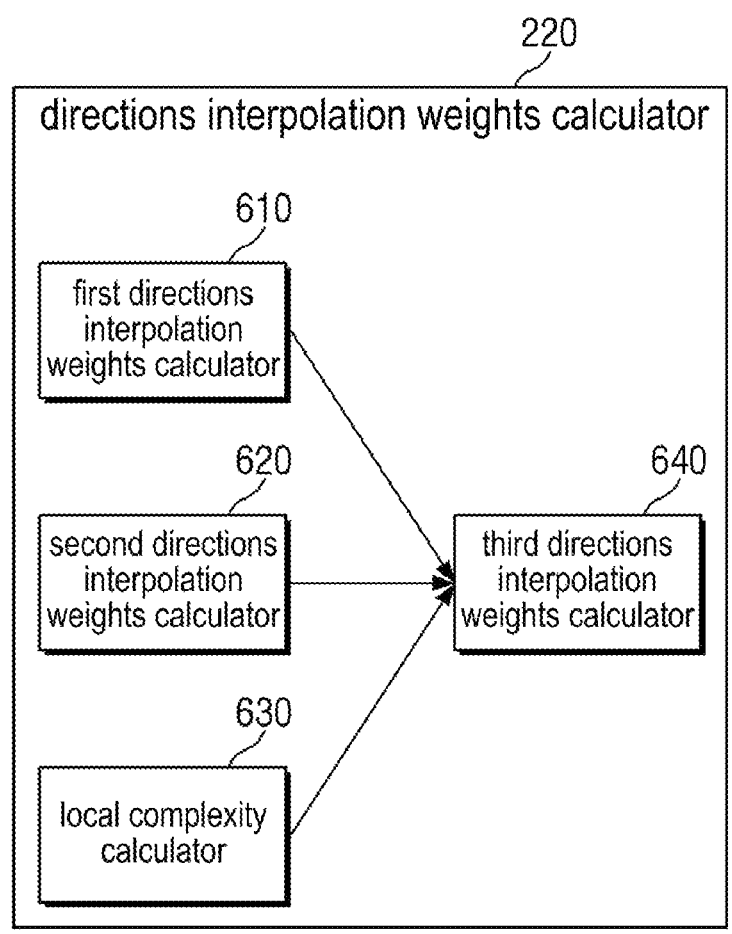
Figure 7:
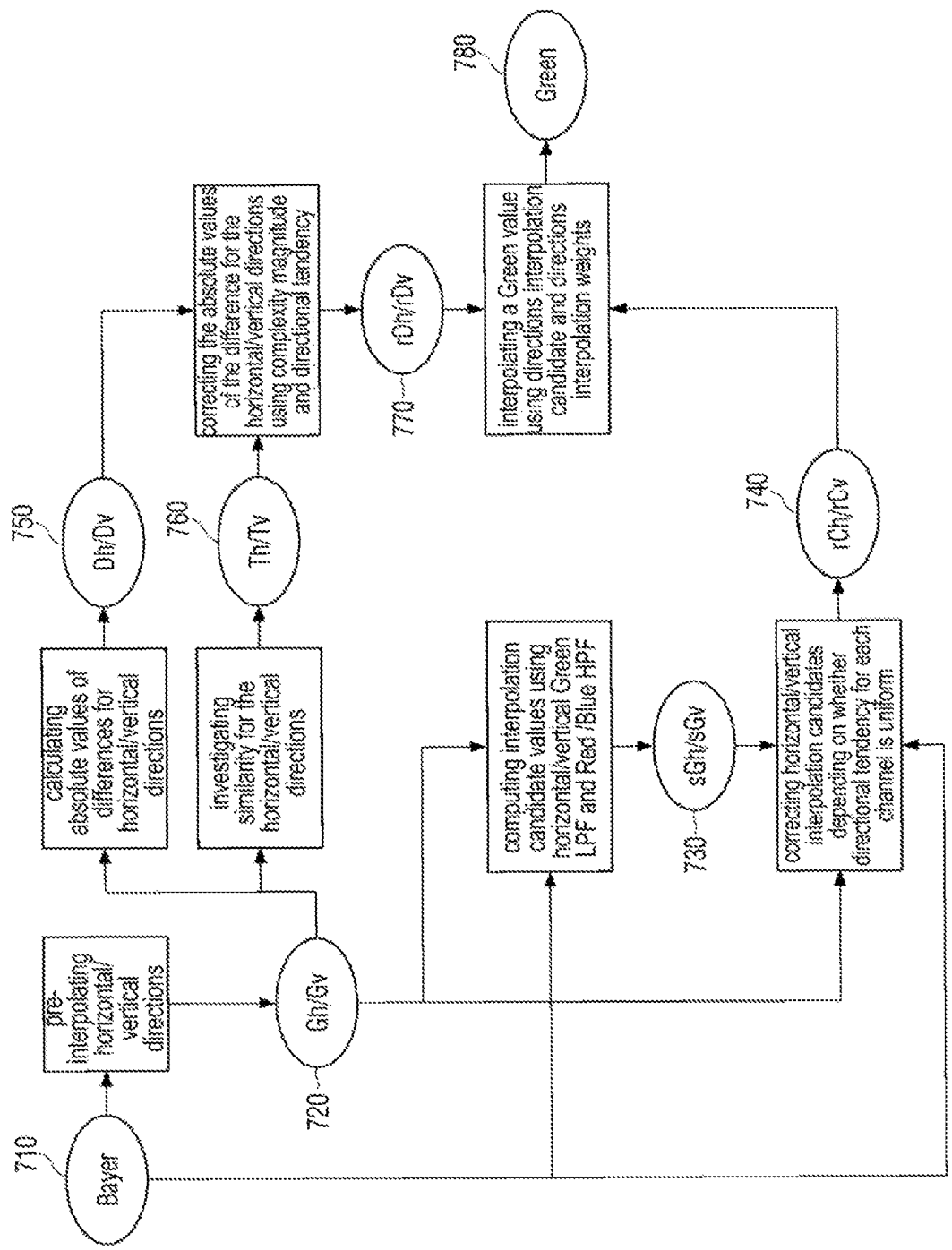

FIGS. 2, 3, and 6 are block diagrams of a device for interpolating a color according to an example embodiment of the disclosure, and FIGS. 4, 5, and 7 are views for explaining a color interpolation process of a device for interpolating a color according to an example embodiment of the disclosure.

As shown in FIG. 2, the processor 111 of the device for interpolating a color 110 may be configured include a directions interpolation candidate values calculator 210, a directions interpolation weights calculator 220, and a G value interpolation execution unit 230, and may further include an R/B values interpolation execution unit 240.

As shown in FIG. 4, color information may be obtained through a Bayer color filter array. However, the disclosure is not limited thereto. Since each pixel of the Bayer color filter array has only R, G, and B values, it is needed to interpolate different color information at each pixel position. First, the device for interpolating colors interpolates a G value at an R pixel position and a B pixel position (Operation 1), then interpolates a B value and an R value at the R pixel position and the B pixel position (Operation 2), and finally, interpolates the R value and the B value at a G pixel position (Operation 3). Since a result of Operation 1 is used in Operations 2 and 3, a process of Operation 1 is the most important.

Operation 1 interpolates the G value by using a process of calculating horizontal/vertical directions interpolation candidate values and a process of calculating horizontal/vertical directions interpolation weights. The device for interpolating a color according to an example embodiment of the disclosure performs a process different from the related art method in using the process of calculating the horizontal/vertical direction interpolation candidate values and the process of calculating the horizontal/vertical direction interpolation weights. The process according to an example embodiment will be described later.

The directions interpolation candidate values calculator 210 calculates horizontal/vertical interpolation candidate values from a Bayer color filter array pattern using a local gradient similarity between the R channel and the G channel or a local gradient similarity between the B channel and the G channel.

More specifically, the directions interpolation candidate values calculator 210 applies weights based on the local gradient similarity to a first method for calculating directions interpolation candidate values through pre-interpolation on the Bayer color filter array pattern and a second method for calculating directions interpolation candidate values by applying a high pass filter to an R channel or a B channel candidate value and applying a low pass filter to a G channel candidate value among the directions interpolation candidate values calculated through the pre-interpolation, thereby applying both the first and the second methods as appropriate and calculating the directions interpolation candidate values based thereon.

As shown in FIG. 3, the directions interpolation candidate values calculator 210 may be configured to include a first directions interpolation candidate values calculator 310, a second directions interpolation candidate values calculator 320, a local gradient similarity calculator 330, and a third directions interpolation candidate values calculator 340. Therefore, it is possible to calculate final directions interpolation candidate values by applying weights according to the local gradient similarity to the first and the second methods for calculating the directions interpolation candidate values.

The first directions interpolation candidate values calculator 310 calculates first horizontal/vertical directions interpolation candidate values through pre-interpolation from the Bayer color filter array pattern.

Referring to FIG. 4, a G value at each pixel is calculated when the pre-interpolation is performed on the Bayer color filter array pattern 410 as shown in FIG. 4. Here, the G value at each pixel derived through the pre-interpolation may be calculated as the first horizontal/vertical directions interpolation candidate values. The first horizontal/vertical directions interpolation candidate values may be expressed as Gh/Gv values.

For example, a process of calculating the first horizontal/vertical directions interpolation candidate values $G25h$ and $G25v$ in a pixel R25 of FIG. 4 may be calculated through the following Equation 1 using a pre-directional interpolation method. However, this is merely an example and the first horizontal/vertical directions interpolation candidate values may be calculated using any other methods. Hereinafter, interpolation for a G value on the pixel R25 will be described as an example. A process of interpolating a G value for each pixel may be performed through the same process, to obtain interpolation results 420 and 430. Since values or weights for each pixel may vary, the degree to which each method is applied may vary according to a characteristic of each pixel. Accordingly, it is possible to adaptively interpolate G values with improved sharpness in all pixels according to the characteristic of a pixel area.

$$G25h=-0.25*R23+0.5*G24+0.5*R25+0.5*G26-0.25*R27$$

$$G25v=-0.25*R11+0.5*G18+0.5*R25+0.5*G32-0.25*R39 \quad \text{<Equation 1>}$$

An interpolation candidate value for the horizontal direction in the pixel R25 is calculated using values of pixels R23, G24, R25, G26, and R27 which are pixels located in the horizontal direction of the pixel R25. An interpolation candidate value for the vertical direction in the pixel R25 is calculated using values of pixels R11, G18, R25, G32, and R39 which are pixels located in the vertical direction of the pixel R25.

The second directions interpolation candidate values calculator 320 calculates the second horizontal/vertical directions interpolation candidate values by applying a high pass filter to an R or a B channel candidate value, which may respectively be expressed as Rh/Rv values or Bh/Bv values, and applying a low pass filter to a G channel candidate value, among the horizontal/vertical directions interpolation candidate values calculated from the first directions interpolation candidate values calculator 310.

The second horizontal/vertical directions interpolation candidate values may be calculated by summing a result of applying a low pass filter (LPF) to Gh/Gv values for each of the horizontal/vertical directions, and a result of applying a high pass filter (HPF) to Rh/Rv or Bh/Bv values for each of the horizontal/vertical directions. The interpolation result 420 of the horizontal direction of the G channel and a portion 510 of an interpolation result of the horizontal direction of the R channel through the pre-interpolation are shown in FIG. 5. Filter coefficients applied to the high pass filter and the low pass filter may be set by a user or preset. Here, the second horizontal/vertical directions interpolation candidate values may be expressed as sGh/sGv.

A process of calculating the second horizontal/vertical directions interpolation candidate values may be calculated through the following Equation 2 (for the pixel R25 as a representative example) using a directional successive approximation method. The second horizontal/vertical directions interpolation candidate values may be calculated using any other methods additionally or alternatively to the directional successive approximation method.

$$sG25h=LPF\{G23h,G24,G25h,G26,G27h\}+HPF\{R23,R24h,R25,R26h,R27\}$$

$$sG25v=LPF\{G11v,G18,G25v,G32,G39v\}+HPF\{R11,R18v,R25,R32v,R39\}$$

$$R24h=-0.25*G22+0.5*R23+0.5*G24+0.5*R25-0.25*G26$$

$$R26h=-0.25*G24+0.5*R25+0.5*G26+0.5*R27-0.25*G28$$

$$R18v=-0.25*G04+0.5*R11+0.5*G18+0.5*R25-0.25*G32$$

$$R32v=-0.25*G18+0.5*R25+0.5*G32+0.5*R39-0.25*G46 \quad \text{<Equation 2>}$$

Combining a result of applying a low-pass filter to the first horizontal/vertical directions interpolation candidate values Gh/Gv with a result of applying a high-pass filter to the horizontal/vertical directions interpolation candidate values Rh/Rv or Bh/Bv may produce sharper G channel interpolation candidate values than using Gh or Gv values as they are. This is because the Gh or Gv channel is a pre-interpolated channel for each of the horizontal/vertical directions, and the R and B channels contain information of an original pixel as it is, so that high frequency components are better preserved. In a similar manner, both the first horizontal/vertical directions interpolation candidate values and the second horizontal/vertical directions interpolation candidate values may be used to obtain final directions interpolation candidate values, while different weights may be applied to the first horizontal/vertical directions interpolation candidate values and the second horizontal/vertical directions interpolation candidate values. To this end, a local gradient similarity may be calculated and used.

The local gradient similarity calculator 330 may calculate a local gradient similarity between the R channel and the G channel or a local gradient similarity between the B channel and the G channel.

When analyzing an edge noise caused by the combination of results of applying the low pass filter and the high pass filter, edge or texture directional tendency of Bayer G values is different from edge or texture directional tendency of Bayer R or B values. Using this point, it is possible to generate G interpolation candidate values with higher sharpness while minimizing an edge noise. Specifically, when generating a horizontal interpolation candidate of a G value in a Bayer R position, a first horizontal gradient directional tendency of local R values of a Bayer image and a second horizontal gradient directional tendency of local G values may be identified, and weights may be set such that if the first horizontal gradient directional tendency and the second horizontal gradient are not similar to each other, the first horizontal/vertical directions interpolation candidate values are applied with a greater weight, and if the first horizontal gradient directional tendency and the second horizontal gradient are similar, the second horizontal/vertical directions interpolation candidate values are applied with a greater weight.

A process of calculating the local gradient similarity between the R channel and the G channel or the local gradient similarity between the B channel and the G channel may be calculated through the following Equation 3 (for the pixel R25 as a representative example). Here, the local gradient similarity for the horizontal direction and the vertical direction may be expressed as mh/mv.

$lg25hm = \max(|R09+2*R23+R37+2*G18+2*G32-R11-2*R25-R39-2*G16-2*G30|, |R11+2*R25+R39+2*G20+2*G34-R13-2*R27-R14-2*G18-2*G32|)$ $lg25vm = \max(|R09+2*R11+R13+2*G24+2*G26-R23-2*R25-R27-2*G10-2*G12|, |R23+2*R25+R27+2*G38+2*G40-R37-2*R29-R41-2*G24-2*G26|)$ if $(lg25hm < th\_low) m25h = 0$ else if $(lg25hm > th\_high) m25h = 1$ else $m25h = (lg25hm - th\_low)/(th\_high - th\_low)$ if $(lg25vm < th\_low) m25v = 0$ else if $(lg25vm > th\_high) m25v = th\_high - th\_low$ else $m25v = (lg25vm - th\_low)/(th\_high - th\_low)$  <Equation 3>

'th_low' and 'th_high' of Equation 3 are threshold values, and may be set depending on a brightness value of an image, and set by a user, or preset. For example, 'th_low' may be set to 24, and 'th_high' may be set to 64. These values are merely examples and may be set in a predetermined range, and may be variously set.

If the local gradient directions of the Bayer R and G channels or the B and G channels in the horizontal/vertical directions are similar, an mh/mv value will have a small value. If the local gradient direction is not similar, the mh/mv value will have a large value.

Using the similarity of local gradients between the horizontal/vertical directions color channels calculated as described above, the second horizontal/vertical directions interpolation candidates may be more effectively calculated.

The third directions interpolation candidate values calculator 340 may apply weights depending on the calculated local gradient similarity to calculate third horizontal/vertical directions interpolation candidate values, which are final horizontal/vertical directions interpolation candidate values, from the first horizontal/vertical directions interpolation candidate values and the second horizontal/vertical directions interpolation candidate values. The third directions interpolation candidate values calculator 340 applies weights such that directions interpolation candidate values of the first horizontal/vertical directions interpolation candidate values and the second horizontal/vertical directions interpolation candidate values are weighted greater based on the calculated local gradient similarity.

The third horizontal/vertical directions interpolation candidate values may be calculated through the following Equation 4 (for the pixel R25 as a representative example). Here, the third horizontal/vertical directions interpolation candidate values may be expressed as rCh/rCv.

$rC25h = m25h*G25h + (1-m25h)*sG25h$ $rC25v = m25v*G25v + (1-m25v)*sG25v$  <Equation 4>

Here, a sum of weights applied to the first horizontal/vertical directions interpolation candidate values and the second horizontal/vertical directions interpolation candidate values is 1. However, the disclosure is not limited thereto.

The directions interpolation weights calculator 220 calculates third horizontal/vertical directions interpolation weights based on the first horizontal/vertical directions interpolation candidate values by using a local complexity.

More specifically, in order to calculate a weighted sum of the third horizontal direction interpolation candidate value and the third vertical direction interpolation candidate value after calculating the third horizontal/vertical directions interpolation candidate values, the directions interpolation weights calculator 220 may calculate the third horizontal/vertical directions interpolation weights to be applied to the third horizontal direction interpolation candidate value and the third vertical direction interpolation candidate value. Hereinafter, a process of determining the third horizontal/vertical directions interpolation weights will be described in detail.

The directions interpolation weights calculator 220 is configured to include a first directions interpolation weights calculator 610, a second horizontal/vertical directions interpolation weights calculator 620, a local complexity calculator 630, and a third directions interpolation weights calculator 640. The directions interpolation weights calculator 220 may calculate the horizontal/vertical directions interpolation weights from the first horizontal/vertical directions interpolation candidate values by using a local complexity.

The first directions interpolation weights calculator 610 may calculate first horizontal/vertical directions interpolation weights using a sum of absolute values of differences for each of the horizontal/vertical directions depending on the first horizontal/vertical directions interpolation candidate values Gh/Gv.

The first directions interpolation weights calculator 610 may calculate the first horizontal/vertical directions interpolation weights using the sum of absolute values of differences for each of the horizontal/vertical directions depending on the first horizontal/vertical directions interpolation candidate values Gh/Gv may be calculated through the following Equation 5 (for the pixel R25 as a representative example), using a sum of directional absolute difference method. In addition to or alternative to the sum of directional absolute difference method described above, the first horizontal/vertical directions interpolation weights may be calculated using any other methods. The sum of the absolute values of the differences for each of the horizontal/vertical directions may be expressed as Dh/Dv, and the first horizontal/vertical directions interpolation weights may be expressed as dWh/dWv.

$D25h = \|G16-G17h\| + \|G17h-G18\| + \|G18-G19h\| + \|G19h-G20\| + \|G23h-G24\| + \|G24-G25h\| + \|G25h-G26\| + \|G26-G27h\| + \|G30-G31h\| + \|G31h-G32\| + \|G32-G33h\| + \|G33h-G34\|$ $D25v = \|G10-G17v\| + \|G17v-G24\| + \|G24-G31v\| + \|G31v-G38\| + \|G11v-G18\| + \|G18-G25v\| + \|G25v-G32\| + \|G32-G39v\| + \|G12-G19v\| + \|G19v-G26\| + \|G26-G33v\| + \|G33v-G40\|$ $dW25h = D25v/(D25h+D25v)$ $dW25v = D25h/(D25h+D25v)$  <Equation 5>

The second directions interpolation weights calculator 620 calculates second horizontal/vertical directions interpolation weights using a local directional tendency depending on the first horizontal/vertical directions interpolation candidate values Gh/Gv.

The second directions interpolation weights calculator 620 may calculate the second horizontal/vertical directions interpolation weights using the local directional tendency depending on the first horizontal/vertical directions interpolation candidate values Gh/Gv may be calculated through the following Equation 6 (for the pixel R25 as a representative example), using the directional adaptive-homogeneity method. In addition to or alternative to the directional adaptive-homogeneity method described above, the second horizontal/vertical directions interpolation weights may be calculated by using any other methods. The local directional tendency may be expressed as Th/Tv, and the second horizontal/vertical directions interpolation weights may be expressed as tWh/tWv.

$$T25h=(|G22-G23h|\leq th)+(|G23h-G24|\leq th)+(|G24-G25h|\leq th)+(|G25h-G26|\leq th)+(|G26-G27h|\leq th)+(|G27h-G28|\leq th)$$

$$T25v=(|G04-G11v|\leq th)+(|G11v-G18|\leq th)+(|G18-G25v|\leq th)+(|G25v-G32|\leq th)+(|G32-G39v|\leq th)+(|G39v-G46|\leq th)$$ <Equation 6>

($X \leq th$): If X is less than or equal to th, it has a value of 1, and if X is greater than th, it has a value of 0.

$$th=\min(\max(|G24-G25h|,|G25h-G26|),\max(|G18-G24v|,|G25v-G32|))$$

if $T25H > T25V, tW25h=1, tW25v=0$ if $T25H < T25V, tW25h=0, tW25v=1$ if $T25H == T25V, tW25h=0.5, tW25v=0.5$

When the G value is interpolated using the first horizontal/vertical directions interpolation weights, the smoothness of the image may increase in a plain area, while a sharpness may reduce in a high complexity area (e.g., texture area), compared to when using the second horizontal/vertical directions interpolation weights. Therefore, when the interpolation is performed by combining the first horizontal/vertical directions interpolation weights and the second horizontal/vertical directions interpolation weights with flexibility in each area of the image, G values having both high smoothness and sharpness may be interpolated.

In a similar manner, both the first horizontal/vertical directions interpolation weights and the second horizontal/vertical directions interpolation weights may be used, while different weights may be applied to the first horizontal/vertical directions interpolation weights and the second horizontal/vertical directions interpolation weights. To this end, a local complexity is used.

The local complexity calculator 630 may calculate the local complexity using the sum of the absolute values of differences for each of the horizontal/vertical directions depending on the directions interpolation candidate values Dh/Dv. When weights for both of the horizontal/vertical direction are summed up or the interpolation is performed on only one direction depending on a local complexity level (e.g., local texture level), it is possible to interpolate the G value with a high smoothness and a high sharpness.

The local complexity using the sum of the absolute values of the differences for each of the horizontal/vertical directions depending on the first horizontal/vertical directions interpolation candidate values may be calculated through the following Equation 7 (for the pixel R25 as a representative example). The local complexity may be calculated using Fourier Transform or Absolute Gradient Summation. Here, the local gradient similarity may be expressed as CP.

$$AD25=D25h+D25v$$

if $(AD25<th\_low) CP25=0$ else if $(AD25>th\_high) CP25=1$ else $CP25=(AD25-th\_low)/(th\_high-th\_low)$ <Equation 7>

'th_low' and 'th_high' of Equation 7 are threshold values, and may be set depending on a brightness value of an image, set by a user, or preset. For example, 'th_low' may be set to 24, and 'th_high' may be set to 64. These values are merely examples and may be set in a predetermined range, and may be variously set.

Using the calculated local complexity as described above, the second horizontal/vertical directions interpolation weights may be calculated more effectively.

The third directions interpolation weights calculator 640 may calculate third horizontal/vertical directions interpolation weights by applying weights, which are determined based on the calculated local complexity, to the sum of the absolute values of the differences for each of the horizontal/vertical directions depending on the first horizontal/vertical directions interpolation candidate values Dh/Dv.

The third horizontal/vertical directions interpolation weights by applying weights depending on the calculated local complexity to the sum of the absolute values of the differences for each of the horizontal/vertical directions depending on the first horizontal/vertical directions interpolation candidate values may be calculated through the following Equation 8 (for the pixel R25 as a representative example). Here, the third horizontal/vertical directions interpolation weights calculator 640 may apply a predetermined correction gain to the weights, which are determined based on the calculated local complexity, and the sum of the absolute values of the differences for each of the horizontal/vertical directions depending on the first horizontal/vertical directions interpolation candidate values Dh/Dv. Here, the third horizontal/vertical directions interpolation weights may be expressed as rDh/rDv.

if $(T25h>T25v) rD25h=D25h, rD25v=D25v+D25v*rGain*CP25$ else if $(T25h<T25v) rD25v=D25v, rD25h=D25h+D25h*rGain*CP25$ else $rD25v=D25v, rD25h=D25h$ <Equation 8>

'rGain' of Equation 8 is a correction gain applied to weights determined based on the calculated local complexity. The correction gain may vary depending on a user's input or a use environment. If the correction gain is greater than 1, the sharpness is increased, and if the correction gain is smaller than 1, the softness is increased. The correction gain may be set by a user input depending on whether a sharp image or a smooth image is desired. Alternatively, the correction gain may be set differently depending on a use environment or a usage. The correction gain may be set to less than 1 so that the softness is emphasized in an environment or an application in which a person or a landscape is captured. The correction gain may be set to greater than 1 so that sharpness is emphasized in an environments or a usage such as a closed circuit television (CCTV). The correction gain depending on the environment or the usage may be stored in a lookup table (LUT) or the like. Alternatively, the correction gain may be preset or may be set to 1.

The G value interpolation execution unit 230 interpolates the G value in the R channel or the B channel using the calculated third horizontal/vertical directions interpolation candidate values rCh/rCv and the calculated horizontal/vertical directions interpolation weights rDh/rDv. The G value interpolation execution unit 230 may interpolate the G value in the R channel or the B channel using the third calculated horizontal/vertical directions interpolation candidate values rCh/rCv from the horizontal/vertical directions interpolation candidate values calculator 210 and the calculated horizontal/vertical directions interpolation weights rDh/rDv from the directions interpolation weights calculator 220.

A interpolated G value in the R channel or the B channel using the calculated horizontal/vertical directions interpolation candidate values rCh/rCv and the calculated horizontal/vertical directions interpolation weights rDh/rDv may be calculated through the following Equation 9 (for the pixel R25 as a representative example). The final result of interpolating the G value may be expressed as rG.

$$rG25 = rC25h*rD25v/(rD25h+rD25v) + rC25v*rD25h/(rD25h+rD25v) \qquad \text{<Equation 9>}$$

As described above, a process of interpolating the G value may be performed on both the R pixel and the B pixel to interpolate the G value in the R channel and the B channel.

The R/B values interpolation execution unit 240 interpolates the R value or the B value based on the result of the G value interpolation execution unit 230, that is, the final interpolated G value.

For the interpolation of the R value, the R value of a pixel in which the B channel is located is interpolated, and the R value located in an original G channel is interpolated. For the interpolation of the R value of the pixel located in the B channel, it may be calculated by first calculating the horizontal/vertical directions interpolation candidates for top-right, down-right, down-left, and right-left directions for the corresponding R pixel located in the B channel; obtaining respective weights for the horizontal/vertical directions interpolation candidate, and summing up a product of the third horizontal/vertical directions interpolation candidate values rCh/rCv and the horizontal/vertical directional weights. Alternatively, for the interpolation of the R value located in the G channel, it may be calculated by first calculating horizontal/vertical directions interpolation candidates for top, down, left, and right directions for the corresponding R pixel located in the G channel; obtaining respective weights for the horizontal/vertical directions interpolation candidate, and summing up a product of the horizontal/vertical directions interpolation candidate values and the horizontal/vertical directional weights. For the interpolation of the B value, the B value of a pixel located in the R channel is interpolated, and the B value of a pixel located in the original G channel is interpolated. The interpolation of the B value corresponds to the interpolation process of the R value, and thus the detailed description thereof will be omitted.

The process of interpolating a color in a device for interpolating a color according to an example embodiment may be performed as shown in FIG. 7. The first horizontal/vertical directions interpolation candidate Gh/Gv 720 are calculated from a Bayer color filter array pattern 710 through pre-interpolation for each of horizontal/vertical directions. The second horizontal/vertical directions interpolation candidate values SGh/sGv 723, which are interpolation candidate values using horizontal/vertical Green LPF and Red/Blue HPF, are calculated using Gh/Gv. Using Gh/Gv and sGh/sGv, the third horizontal/vertical directions interpolation candidate values rCh/rCv 740 are calculated by interpolating horizontal/vertical interpolation candidates Gh/Gv and sGh/sGv depending on the uniformity of directional tendency for each channel.

In addition, the absolute values of the differences for each of the horizontal/vertical directions depending on the first horizontal/vertical directions interpolation candidate values Dh/Dv 750 are calculated using Gh/Gv, the local directional tendency Th/Tv 760 are calculated by identifying horizontal/vertical directions similarity using Gh/Gv. The third horizontal/vertical directions interpolation weights rDh/rDv 770 are calculated by interpolating the absolute values of the differences for each of the horizontal/vertical directions depending on the first horizontal/vertical directions interpolation candidate values Dh/Dv by using complexity magnitude and directional tendency.

A green value 780 is finally interpolated using the third horizontal/vertical directions interpolation candidate values rCh/rCv and the third horizontal/vertical directions interpolation weights rDh/rDv.

Figure 8:
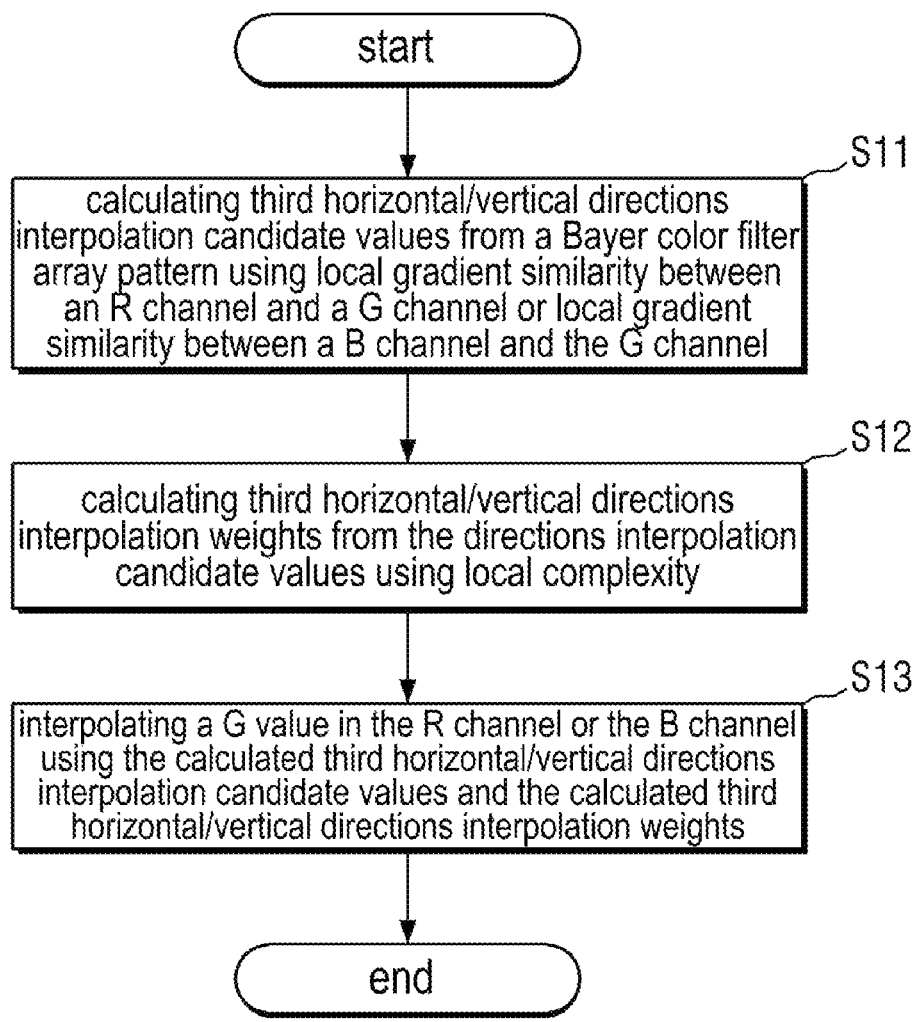
FIG. 8 is a flowchart of a method for interpolating a color according to an example embodiment of the disclosure.

FIG. 8 is a flowchart of a method for interpolating a color according to an example embodiment of the disclosure, and FIGS. 9 to 12 are flowcharts of a method for interpolating a color according to an example embodiment of the disclosure. The detailed description of each operation of FIGS. 8 to 12 corresponds to the detailed description of a process of performing color interpolation in the device for interpolating a color of FIGS. 1 through 7. Therefore, duplicate explanations will be omitted below. Each operation of FIGS. 6 through 9 may be performed by one or more processors included in the device for interpolating a color according to example embodiments.

Referring to FIG. 8, in Operation S11, third horizontal/vertical interpolation candidate values from a Bayer color filter array pattern are calculated using a local gradient similarity between the R channel and the G channel or a local gradient similarity between the B channel and the G channel.

Figure 9:
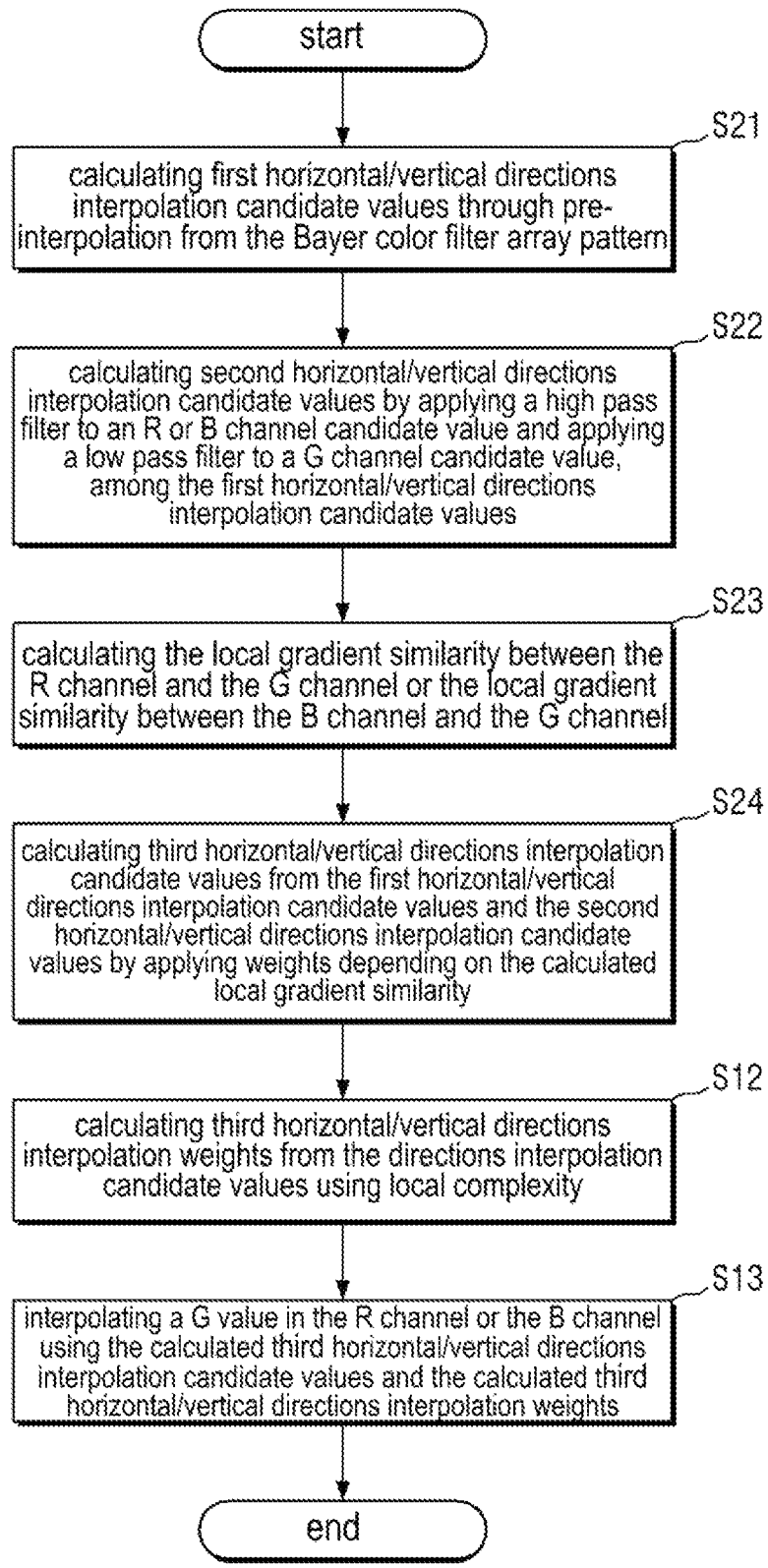
FIGS. 9 to 12 are flowcharts of a method for interpolating a color according to an example embodiment of the disclosure.

Specifically, Operation S11 of calculating the third horizontal/vertical directions interpolation candidate values may be performed through Operations S21 through S24, as shown in FIG. 9.

In Operation S21, first horizontal/vertical directions interpolation candidate values may be calculated through pre-interpolation from the Bayer color filter array pattern. Here, a Pre-directional interpolation method may be used. In Operation S22, second horizontal/vertical directions interpolation candidate values may be calculated by applying a high pass filter to an R or a B channel candidate value and applying a low pass filter to a G channel candidate value, among the first horizontal/vertical directions interpolation candidate values. Here, a directional successive approximation method may be used. However, the disclosure is not limited thereto, and any other methods may be used. In Operation S23, a local gradient similarity between the R channel and the G channel or a local gradient similarity between the B channel and the G channel is calculated. In Operation S24, the third horizontal/vertical directions interpolation candidate values may be calculated based on the first horizontal/vertical directions interpolation candidate values and the second horizontal/vertical directions interpolation candidate values, by applying weights depending on the calculated local gradient similarity. Here, a sum of weights applied to the first horizontal/vertical directions interpolation candidate values and the second horizontal/vertical directions interpolation candidate values may be 1. However, the disclosure is not limited thereto.

After the third horizontal/vertical directions interpolation candidate values are calculated in Operation S11, third horizontal/vertical directions interpolation weights are calculated from the first horizontal/vertical directions interpolation candidate values using the local complexity in Operation S12.

Figure 10:
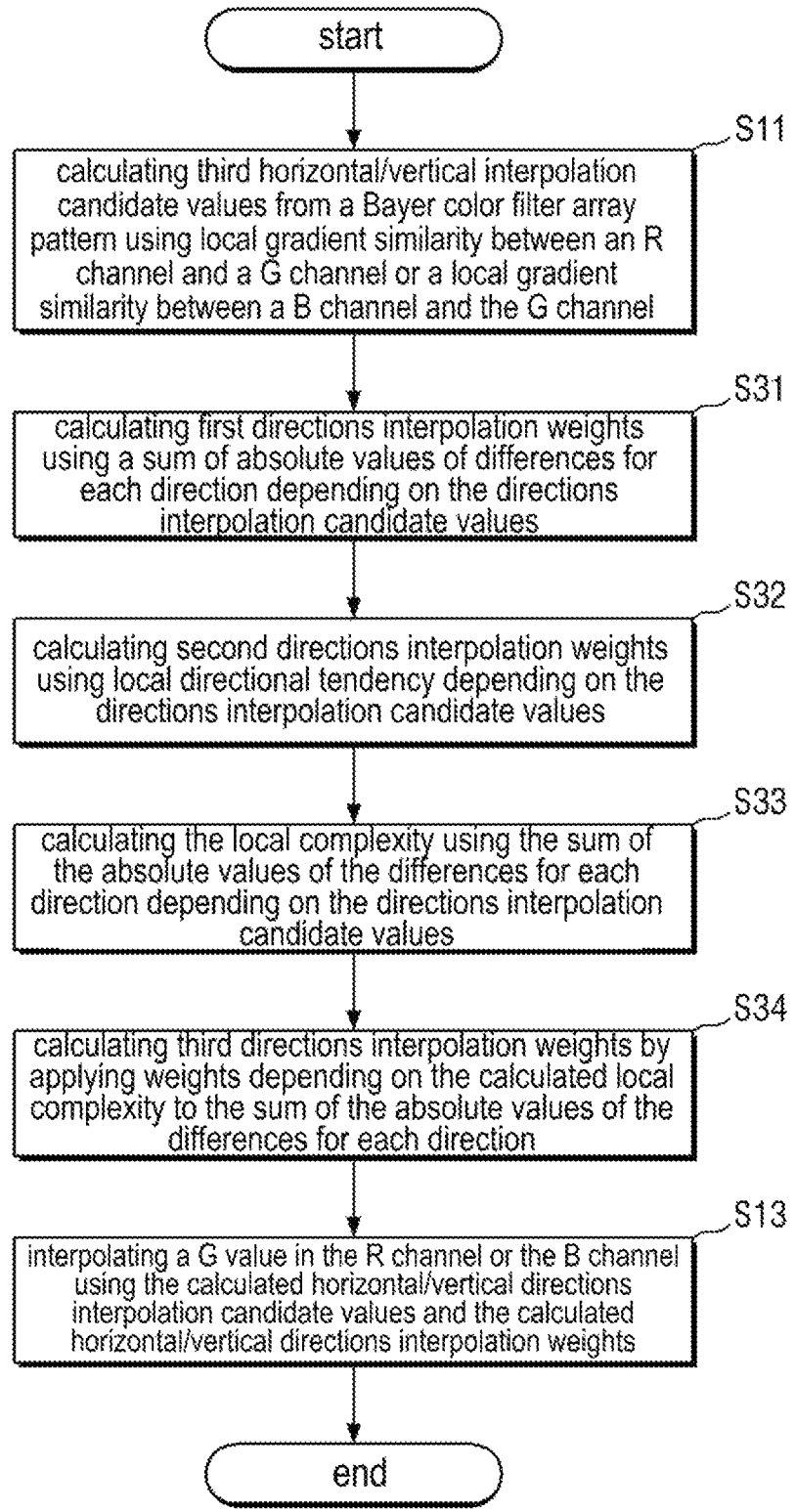

Specifically, Operation S12 of calculating the third horizontal/vertical directions interpolation weights may be performed through Operations S31 through S34 in FIG. 10, which will be described below.

In option 13, a G value in the R channel or the B channel is interpolated by using the calculated third horizontal/vertical directions interpolation candidate values and the third horizontal/vertical directions interpolation weights.

In Operation S31, first horizontal/vertical directions interpolation weights may be calculated using a sum of absolute values of differences for each of the horizontal/vertical directions depending on the first horizontal/vertical directions interpolation candidate values. Here, a sum of directional absolute difference method may be used, but the disclosure is not limited thereto. In Operation S32, second horizontal/vertical directions interpolation weights may be calculated using a local directional tendency depending on the first horizontal/vertical directions interpolation candidate values. Here, a directional adaptive-homogeneity method may be used, but the disclosure is not limited thereto and any other methods may be used. In Operation S33, the local complexity may be calculated using a sum of absolute values of differences for each of the horizontal/vertical directions depending on the first horizontal/vertical directions interpolation candidate values. Here, the local complexity may be calculated using a Fourier transform or an absolute gradient summation. In Operation S34, third horizontal/vertical directions interpolation weights may be calculated by applying weights, which are determined based on the calculated local complexity, to the sum of the absolute values of the differences for each of the horizontal/vertical directions depending on the first horizontal/vertical directions interpolation candidate values.

Figure 11:
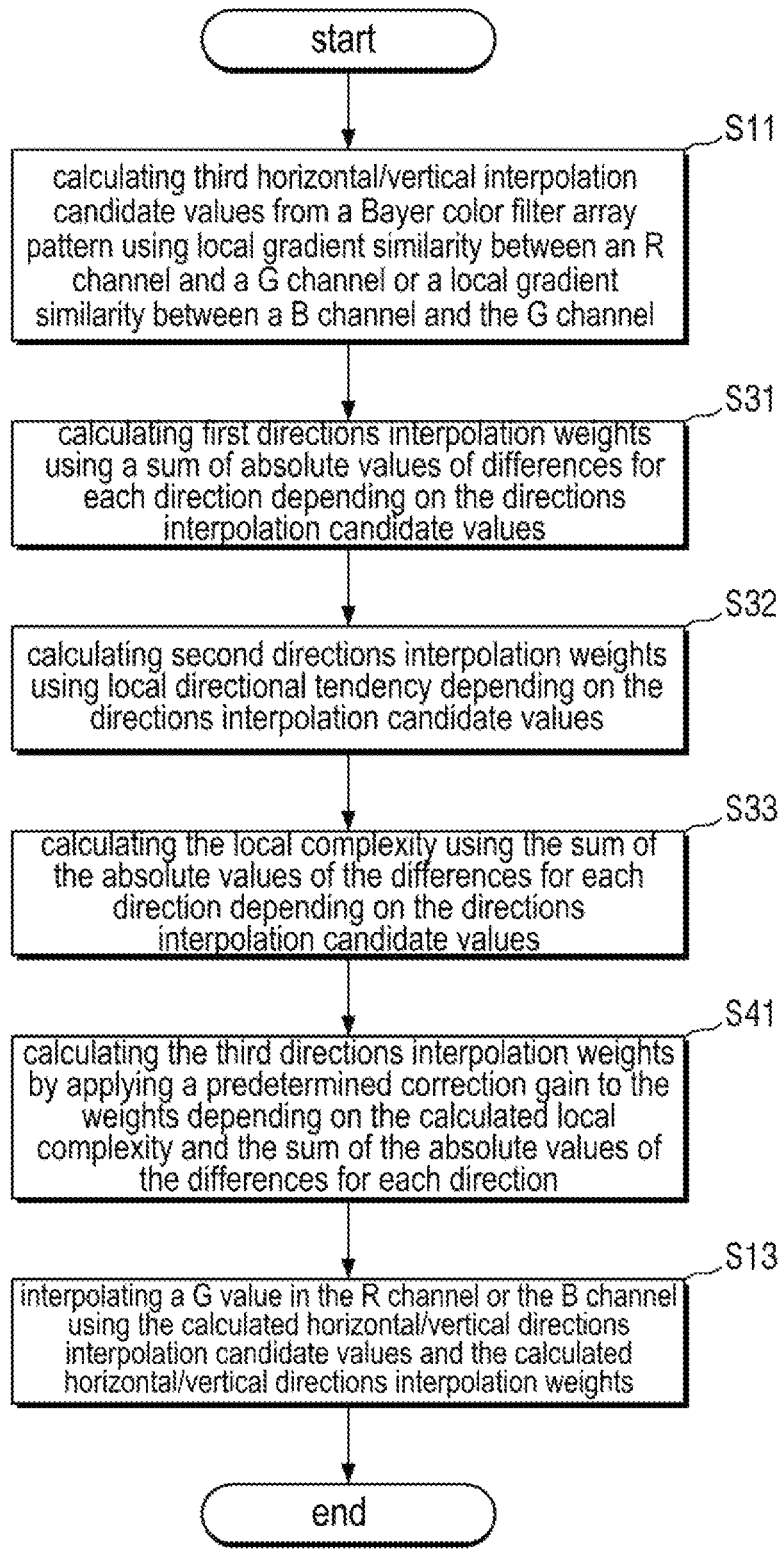

According to an example embodiment, in Operation S41 as shown in FIG. 11, a predetermined correction gain may be applied to the weights, determined based on the calculated local complexity, to the sum of the absolute values of the differences for each of the horizontal/vertical directions depending on the first horizontal/vertical directions interpolation candidate values. The correction gain may vary depending on a user's input or a use environment.

After the third horizontal/vertical directions interpolation weights are calculated in Operation S12, the G value in the R channel or the B channel is interpolated using the third calculated horizontal/vertical directions interpolation candidate values and the calculated third horizontal/vertical directions interpolation weights in Operation 13.

Figure 12:
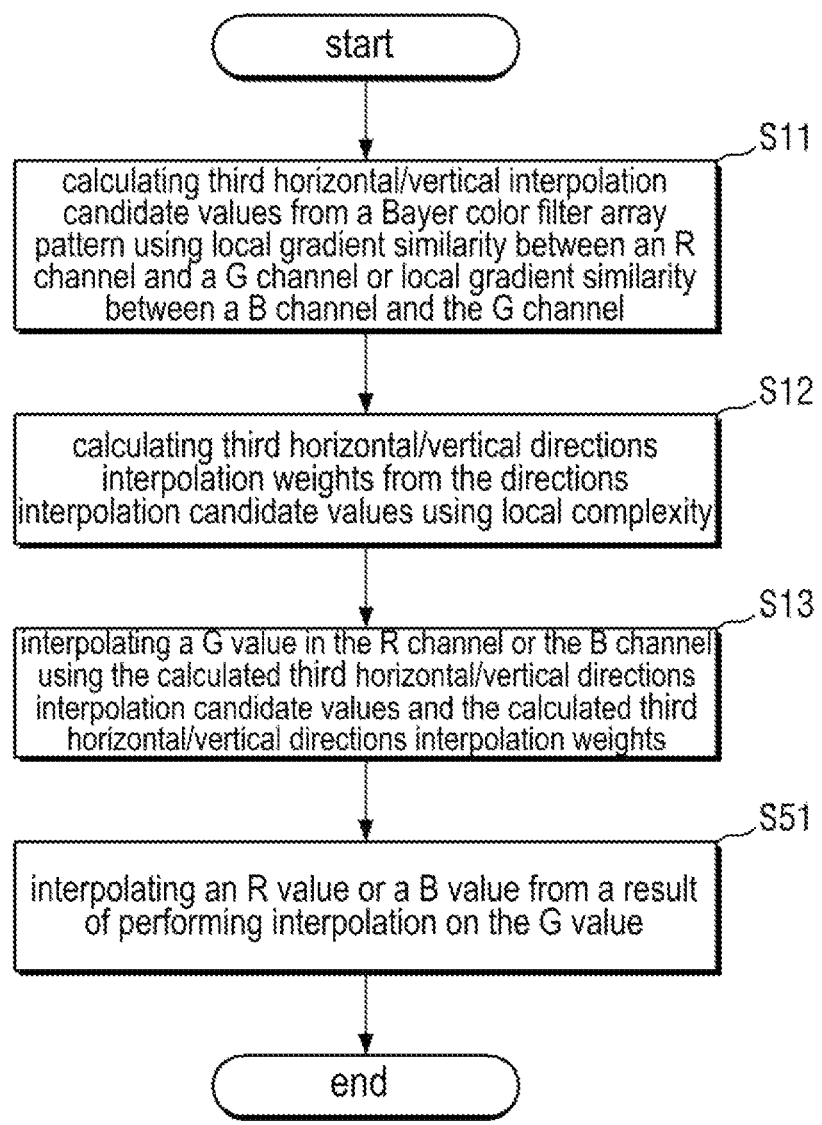

The method for interpolating a color according to an example embodiment may further include interpolating the R value and the B value from a result of interpolating the G value in Operation S51, as shown in FIG. 12.

Example embodiments of the disclosure may be implemented in the form of program instructions that may be executed by various computer means, and be recorded on a computer readable medium. The computer readable medium may include program instructions, data files, data structures, or the like, alone or in combination. The program instructions recorded on the medium may be those specially designed and constructed for the purposes of the disclosure, or they may be of the kind well-known and available to those having skill in the computer software arts. An example of a computer readable recording medium includes magnetic media such as hard disks, floppy disks and magnetic tape, optical media such as CD-ROMs, DVDs, magneto-optical media, such as floptical disks, and hardware devices specifically configured to store and execute program instructions such as ROMs, RAMs, flash memories, or the like. The computer readable recording medium may also be distributed over network coupled computer systems so that the computer readable code is stored and executed in a distributed fashion. Functional programs, codes, and code segments for implementing the disclosure may be easily inferred by programmers in the art to which the disclosure belongs. Examples of program instructions include machine codes, such as produced by a compiler, as well as high-level language codes that may be executed by a computer using an interpreter or the like. The hardware device described above may be configured to operate as one or more software modules to perform the operations of the disclosure, and vice versa.

According to the example embodiments, it is possible to interpolate a G value having a high sharpness while minimizing an edge noise with flexibility in each area of an image. It is also possible to interpolate a G value having a high smoothness and a high sharpness with flexibility in each area of an image.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The disclosure has been described herein with regard to example embodiments. However, it will be obvious to those skilled in the art that various modifications may be made without departing from the gist of the disclosure. Therefore, it is to be understood that that the scope of the disclosure is not limited to the above-mentioned embodiments, but is intended to include various modifications and equivalents included within the spirit and scope of the appended claims.

What is claimed is:

1. A device for interpolating a color, comprising at least one processor to implement:
   a directions interpolation candidate values calculator configured to calculate third horizontal/vertical directions interpolation candidate values with respect to a pixel in a red (R) channel or a blue (B) channel on a Bayer color filter array pattern, based on a local gradient similarity between the R channel and a green (G) channel or a local gradient similarity between the B channel and the G channel;
   a directions interpolation weights calculator configured to calculate third horizontal/vertical directions interpolation weights based on first horizontal/vertical directions interpolation candidate values by using a local complexity; and
   a G value interpolation execution unit configured to interpolate a G value of the pixel in the R channel or the B channel based on the calculated third horizontal/vertical directions interpolation candidate values and the calculated third horizontal/vertical directions interpolation weights,
   wherein the directions interpolation candidate values calculator comprises:
   a first directions interpolation candidate values calculator configured to calculate the first horizontal/vertical directions interpolation candidate values through pre-interpolation with respect to the pixel on the Bayer color filter array pattern;
   a second directions interpolation candidate values calculator configured to calculate second horizontal/vertical directions interpolation candidate values by applying a high pass filter to an R channel candidate value and a B channel candidate value and applying a low pass filter to a G channel candidate value, among the first horizontal/vertical directions interpolation candidate values;
   a local gradient similarity calculator configured to calculate the local gradient similarity between the R channel and the G channel or the local gradient similarity between the B channel and the G channel; and
   a third directions interpolation candidate values calculator configured to calculate the third horizontal/vertical directions interpolation candidate values, based on the first horizontal/vertical directions interpolation candidate values and the second horizontal/vertical directions interpolation candidate values by applying weights, which are determined based on the calculated local gradient similarity.

2. The device of claim 1, wherein a sum of the weights applied to the first horizontal/vertical directions interpolation candidate values and the second horizontal/vertical directions interpolation candidate values is 1.

3. The device of claim 1, wherein the first directions interpolation candidate values calculator is configured to calculate the first horizontal/vertical directions interpolation candidate values by using a pre-directional interpolation method, and the second directions interpolation candidate values calculator is configured to calculate the second horizontal/vertical directions interpolation candidate values by using a directional successive approximation method.

4. The device of claim 1, wherein the directions interpolation weights calculator comprises:
   a first directions interpolation weights calculator configured to calculate first horizontal/vertical directions interpolation weights based on a sum of absolute values of differences for each of horizontal/vertical directions depending on the first horizontal/vertical directions interpolation candidate values;
   a second directions interpolation weights calculator configured to calculate second horizontal/vertical directions interpolation weights based on a local directional tendency depending on the first horizontal/vertical directions interpolation candidate values;
   a local complexity calculator configured to calculate the local complexity based on the sum of the absolute values of the differences for each of the horizontal/vertical directions depending on the first horizontal/vertical directions interpolation candidate values; and
   a third directions interpolation weights calculator configured to calculate the third horizontal/vertical directions interpolation weights by applying weights, which are determined based on the calculated local complexity, to the sum of the absolute values of the differences for each of the horizontal/vertical directions depending on the first horizontal/vertical directions interpolation candidate values.

5. The device of claim 4, wherein the local complexity calculator is configured to calculate the local complexity by using a Fourier transform or an absolute gradient summation.

6. The device of claim 4, wherein the third directions interpolation weights calculator is configured to apply a predetermined correction gain to be applied to the weights, which are determined based on the calculated local complexity, and the sum of the absolute values of the differences for each of the horizontal/vertical directions depending on the first horizontal/vertical directions interpolation candidate values.

7. The device of claim 6, wherein the predetermined correction gain is determined based on a user's input or a usage environment.

8. The device of claim 4, wherein the first directions interpolation weights calculator is configured to calculate the first horizontal/vertical directions interpolation weights by using a sum of directional absolute difference method, and the second directions interpolation weights calculator is configured to calculate the second horizontal/vertical directions interpolation weights by using a directional adaptive-homogeneity method.

9. The device of claim 1, further comprising:
   an R/B values interpolation execution unit configured to interpolate at least one of an R value or a B value based on the interpolated G value.

10. A method for interpolating a color performed by a device for interpolating a color, wherein the device comprise one or more processors, the method comprising:
    calculating third horizontal/vertical directions interpolation candidate values with respect to a pixel in a red (R) channel or a blue (B) channel on a Bayer color filter array pattern, based on a local gradient similarity between the R channel and the G channel or a local gradient similarity between the B channel and the G channel;
    calculating third horizontal/vertical directions interpolation weights based on first horizontal/vertical directions interpolation candidate values by using a local complexity; and
    interpolating a G value of the pixel in the R channel or the B channel based on the calculated third horizontal/vertical directions interpolation candidate values and the calculated third horizontal/vertical directions interpolation weights, wherein the calculating the third horizontal/vertical directions interpolation weights comprises:
calculating first horizontal/vertical directions interpolation weights based on a sum of absolute values of differences for each of horizontal/vertical directions depending on the first horizontal/vertical directions interpolation candidate values;
calculating second horizontal/vertical directions interpolation weights based on a local directional tendency depending on the first horizontal/vertical directions interpolation candidate values;
calculating the local complexity based on the sum of the absolute values of the differences for each of the horizontal/vertical directions depending on the first horizontal/vertical directions interpolation candidate values; and
calculating the third horizontal/vertical directions interpolation weights by applying weights, which are determined based on the calculated local complexity, to the sum of the absolute values of the differences for each of the horizontal/vertical directions depending on the first horizontal/vertical directions interpolation candidate values.

11. The method of claim 10, wherein the calculating the third horizontal/vertical directions interpolation candidate values comprises:
calculating the first horizontal/vertical directions interpolation candidate values through pre-interpolation with respect to the pixel on the Bayer color filter array pattern;
calculating second horizontal/vertical directions interpolation candidate values by applying a high pass filter to an R channel candidate value and a B channel candidate value and applying a low pass filter to a G channel candidate value, among the first horizontal/vertical directions interpolation candidate values;
calculating the local gradient similarity between the R channel and the G channel or the local gradient similarity between the B channel and the G channel; and
calculating the third horizontal/vertical directions interpolation candidate values, based on the first horizontal/vertical directions interpolation candidate values and the second horizontal/vertical directions interpolation candidate values by applying weights, which are determined based on the calculated local gradient similarity.

12. The method of claim 11, wherein a sum of the weights applied to the first horizontal/vertical directions interpolation candidate values and the second horizontal/vertical directions interpolation candidate values is 1.

13. The method of claim 11, wherein the first horizontal/vertical directions interpolation candidate values are calculated by using a pre-directional interpolation method, and the second horizontal/vertical directions interpolation candidate values are calculated by using a directional successive approximation method.

14. The method of claim 10, wherein the local complexity is calculated by using a Fourier transform or an absolute gradient summation.

15. The method of claim 10, wherein the calculating the third horizontal/vertical directions interpolation weights comprises applying a predetermined correction gain to the weights, which are determined based on the calculated local complexity, and the sum of the absolute values of the differences for each of the horizontal/vertical directions depending on the first horizontal/vertical directions interpolation candidate values.

16. The method of claim 15, wherein the predetermined correction gain is determined based on a user's input or a usage environment.

17. The method of claim 10, wherein the first horizontal/vertical directions interpolation weights are calculated by using a sum of directional absolute difference method, and
wherein the second horizontal/vertical directions interpolation weights are calculated by using a directional adaptive-homogeneity method.

18. The method of claim 10, further comprising:
interpolating at least one of an R value or a B value based on the interpolated G value.

* * * * *